(12) United States Patent
Pierron et al.

(10) Patent No.: US 9,975,402 B2
(45) Date of Patent: May 22, 2018

(54) ELECTRICAL HEATING DEVICE FOR A MOTOR VEHICLE AND VEHICLE AND ASSOCIATED AIR-CONDITIONING AND/OR HEATING UNIT

(75) Inventors: Frederic Pierron, Rambouillet (FR); Laurent Tellier, Paris (FR); Jose Leborgne, Luisant (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 773 days.

(21) Appl. No.: 14/342,845

(22) PCT Filed: Sep. 3, 2012

(86) PCT No.: PCT/EP2012/003678
§ 371 (c)(1),
(2), (4) Date: May 1, 2014

(87) PCT Pub. No.: WO2013/034269
PCT Pub. Date: Mar. 14, 2013

(65) Prior Publication Data
US 2014/0314398 A1    Oct. 23, 2014

(30) Foreign Application Priority Data

Sep. 6, 2011   (FR) ...................................... 11 02696

(51) Int. Cl.
*F24H 1/10*      (2006.01)
*B60H 1/22*      (2006.01)
(Continued)

(52) U.S. Cl.
CPC ......... *B60H 1/2221* (2013.01); *F24D 3/1041* (2013.01); *F24H 1/101* (2013.01);
(Continued)

(58) Field of Classification Search
CPC ................................ A47L 13/225; A47L 11/34
(Continued)

(56) References Cited

U.S. PATENT DOCUMENTS 1,120,830 A * 12/1914 Mann ...................... F24H 1/162
                                                              123/549
1,671,677 A    5/1928  Keeton
(Continued)

FOREIGN PATENT DOCUMENTS

EP       1 872 986 A1    1/2008
GB         199 967       7/1923
(Continued)

OTHER PUBLICATIONS

International Search Report for Application No. PCT/EP2012/003686 dated Oct. 18, 2012, 7 pages.
(Continued)

*Primary Examiner* — Phuong Nguyen
(74) *Attorney, Agent, or Firm* — Howard & Howard Attorneys PLLC

(57) ABSTRACT

The invention relates to an electrical liquid heating device for a motor vehicle. The heating device comprises at least a first (7a) and a second (7b) heating module for heating the aforementioned liquid, defining at least one circuit (15) for guiding the liquid to be heated. The device is characterized in that the heating modules (7a, 7b) each have a generally cylindrical shape and are arranged side by side substantially in parallel. The invention also relates to a heating and/or air-conditioning unit for a motor vehicle, comprising such a heating device (5).

20 Claims, 4 Drawing Sheets

Figure 5A:
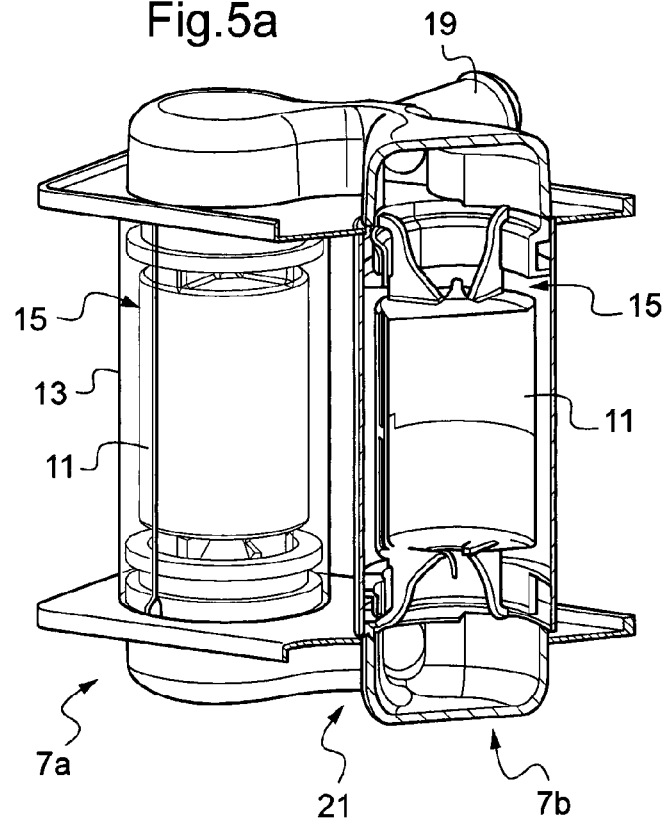

(51) Int. Cl.
*F24H 9/00* (2006.01)
*F24H 1/14* (2006.01)
*F24D 3/10* (2006.01)
*F01P 11/02* (2006.01)

(52) U.S. Cl.
CPC .......... *F24H 1/142* (2013.01); *F24H 9/0015* (2013.01); *F01P 11/029* (2013.01); *F01P 2060/08* (2013.01); *F01P 2070/04* (2013.01)

(58) Field of Classification Search
USPC .......... 99/438, 436, 629, 635, 385; 392/397, 392/480, 405, 478, 485, 490, 386; 219/438, 436, 629, 635, 385
See application file for complete search history.

(56) References Cited

U.S. PATENT DOCUMENTS

| | | | |
|---|---|---|---|
| 1,689,521 A | 10/1928 | Dominguez | |
| 1,766,068 A | 6/1930 | De Lannoy | |
| 1,922,509 A | 8/1933 | Thurm | |
| 2,145,104 A * | 1/1939 | Wright | F22B 1/284 219/385 |
| 2,266,216 A | 12/1941 | Kimberlin | |
| 2,530,382 A | 11/1950 | Downs | |
| 2,589,566 A | 3/1952 | Neth | |
| 2,663,787 A | 12/1953 | Alexander | |
| 3,209,126 A | 9/1965 | Elias | |
| 3,389,538 A * | 6/1968 | Carel | G01N 30/12 392/397 |
| 3,584,194 A | 6/1971 | Kautz et al. | |
| 3,898,428 A | 8/1975 | Dye | |
| 4,199,675 A | 4/1980 | Sharpless | |
| 4,286,140 A | 8/1981 | Dewulf et al. | |
| 4,458,138 A | 7/1984 | Adrian et al. | |
| 4,461,735 A | 7/1984 | Wirt | |
| 4,465,922 A | 8/1984 | Kolibas | |
| 4,563,571 A | 1/1986 | Koga et al. | |
| 4,808,793 A | 2/1989 | Hurko | |
| 5,434,388 A | 7/1995 | Kralik et al. | |
| 6,053,132 A | 4/2000 | Evans | |
| 6,094,524 A | 7/2000 | Riley | |
| 6,637,378 B1 | 10/2003 | Al-Amin | |
| 7,286,752 B2 | 10/2007 | Gourand | |
| 7,756,404 B2 | 7/2010 | Schubert et al. | |
| 8,641,896 B2 | 2/2014 | Remacha et al. | |
| 2003/0007790 A1 | 1/2003 | Harris | |
| 2005/0095168 A1* | 5/2005 | Centanni | A61L 2/07 422/3 |
| 2008/0000889 A1 | 1/2008 | Niederer et al. | |
| 2008/0050103 A1* | 2/2008 | Lin | F24F 6/18 392/407 |
| 2009/0107974 A1 | 4/2009 | Testa | |
| 2010/0046934 A1 | 2/2010 | Johnson et al. | |
| 2011/0041781 A1 | 2/2011 | Deivasigamani et al. | |
| 2012/0315024 A1 | 12/2012 | Obst et al. | |

FOREIGN PATENT DOCUMENTS

| | | | |
|---|---|---|---|
| WO | WO 2010/021939 A1 | 2/2010 | |
| WO | WO 2011/054970 A2 | 5/2011 | |

OTHER PUBLICATIONS

International Search Report for Application No. PCT/EP2012/003678 dated Oct. 18, 2012, 7 pages.
English language abstract for EP 1 872 986 extracted from espacenet.com database on Jun. 16, 2014, 20 pages.
English language abstract for WO 2011/054970 extracted from espacenet.com database on Jun. 16, 2014, 36 pages.

* cited by examiner

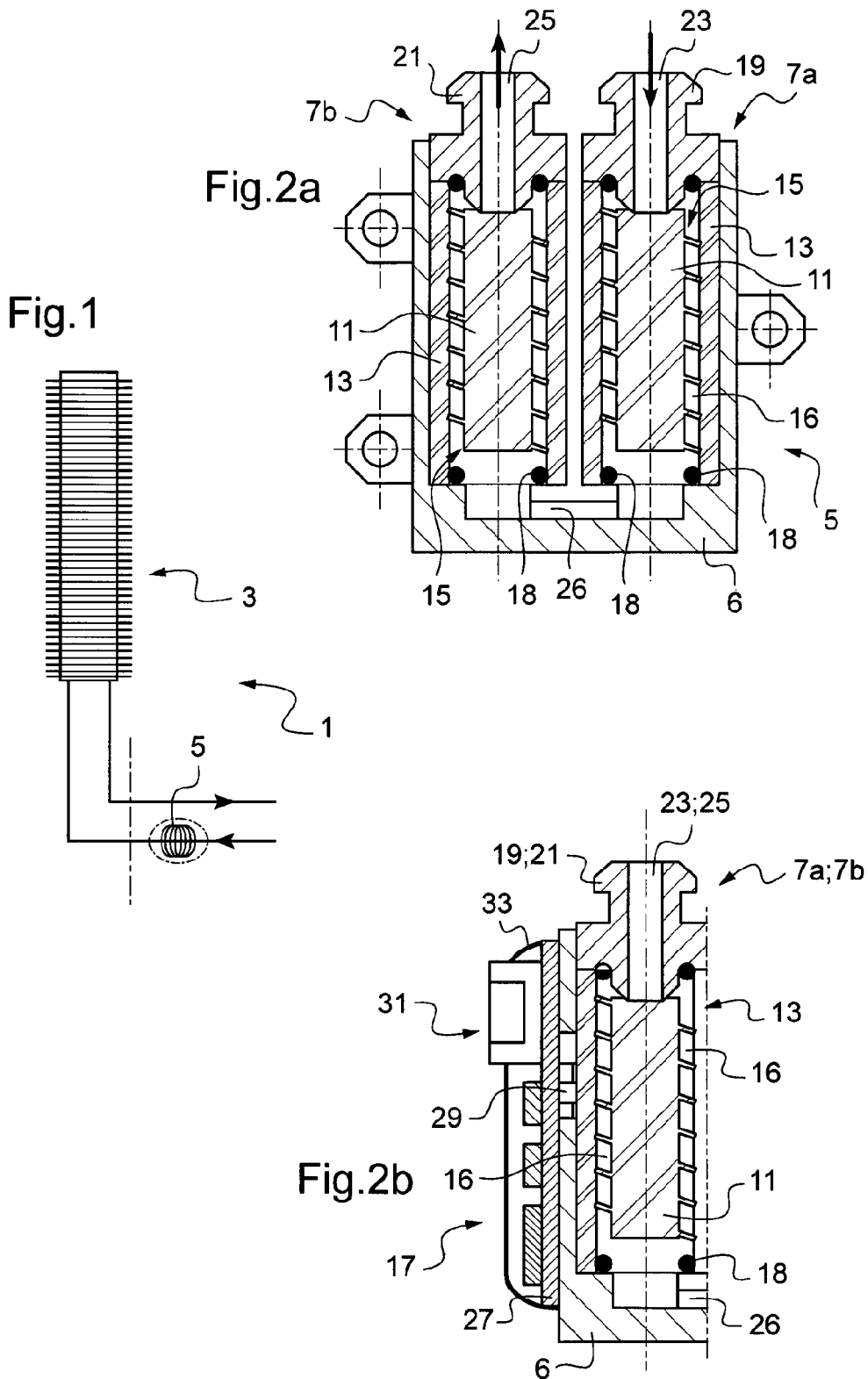

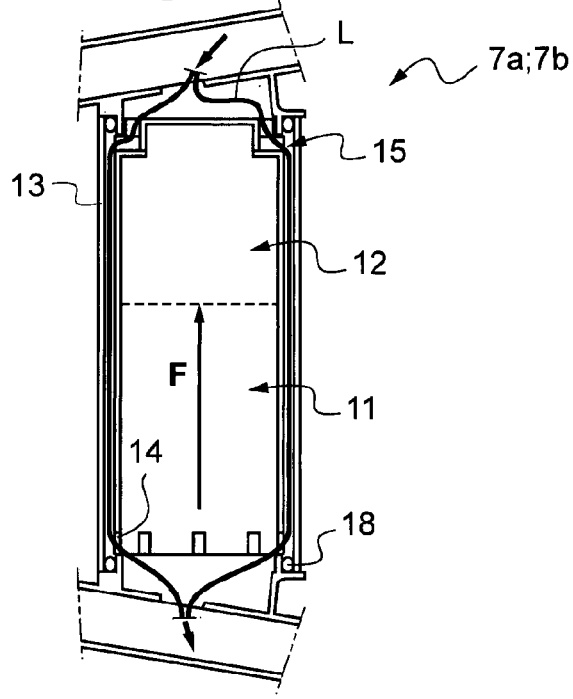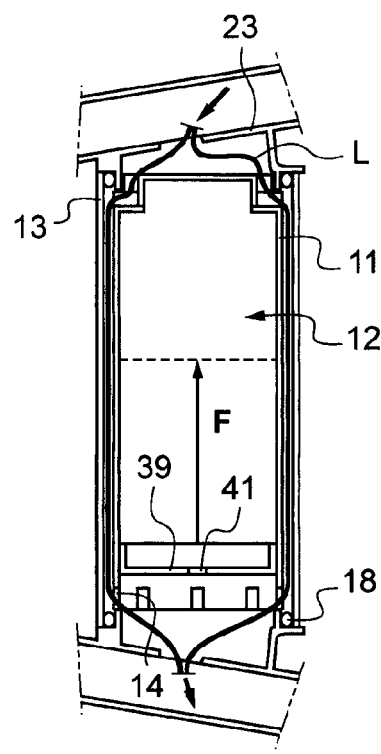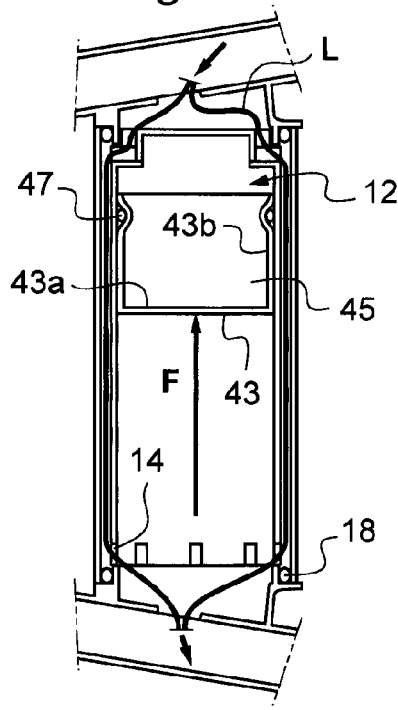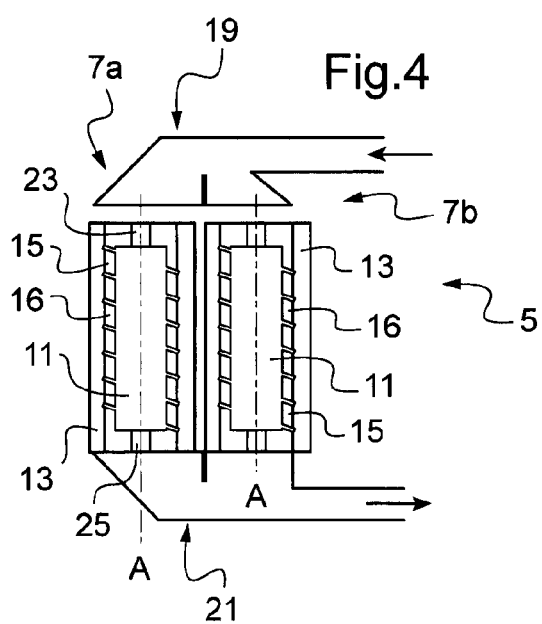

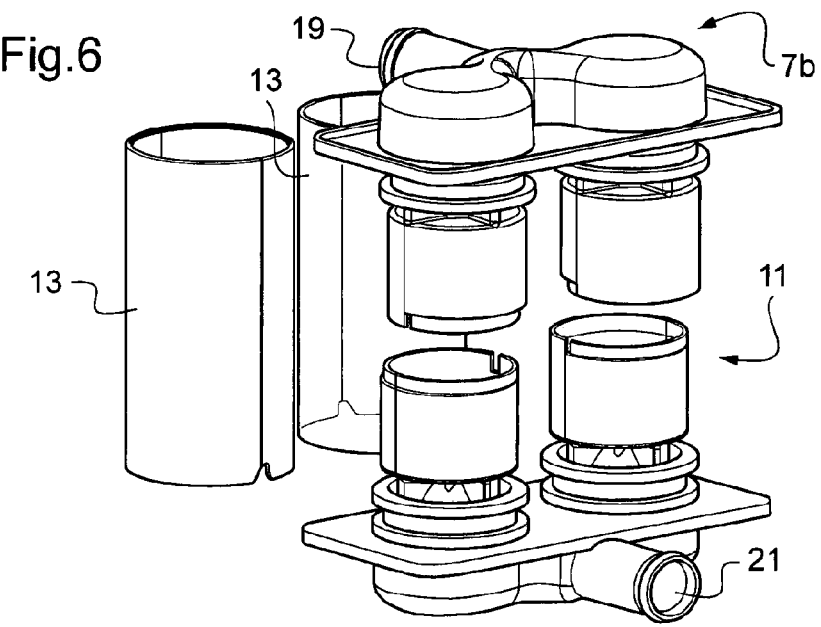
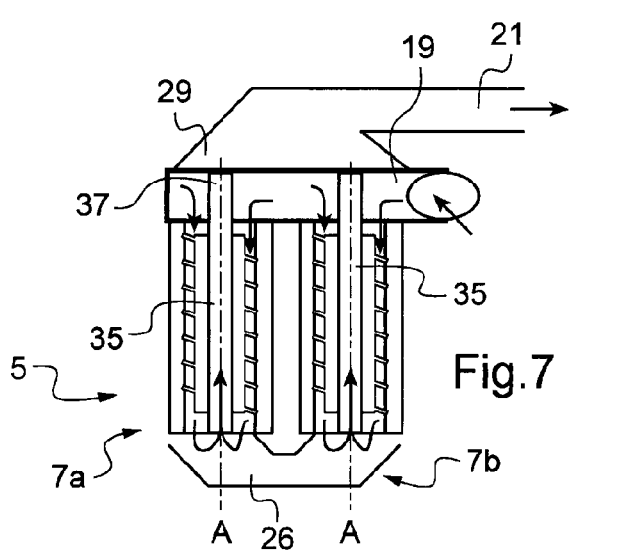
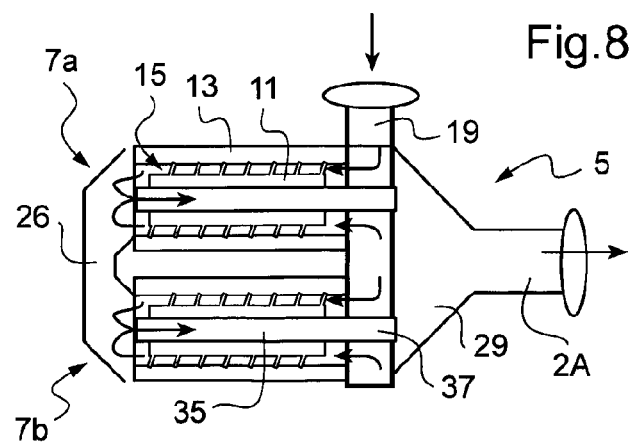

ELECTRICAL HEATING DEVICE FOR A MOTOR VEHICLE AND VEHICLE AND ASSOCIATED AIR-CONDITIONING AND/OR HEATING UNIT

RELATED APPLICATIONS

This application is the National Stage of International Patent Application No. PCT/EP2012/003678, filed on Sep. 3, 2012, which claims priority to and all the advantages of French Patent Application No. FR 11/02696, filed on Sep. 6, 2011, the content of which is incorporated herein by reference.

The invention relates to an electrical heating device for a motor vehicle. The invention applies more particularly to heating and/or air-conditioning units of motor vehicles.

Conventionally, the heating up of the air intended for heating the passenger compartment of a motor vehicle, and also for defogging and defrosting, is carried out by the passage of a flow of air through a heat exchanger, more precisely by an exchange of heat between the flow of air and a liquid.

In general, this is the coolant in the case of a heat engine.

However, this mode of heating may prove unsuitable or insufficient to ensure rapid and effective heating of the passenger compartment of the vehicle, in particular to heat up the passenger compartment or to ensure defogging or defrosting before the vehicle is used in a very cold environment or else when a very rapid increase in the temperature is desired.

In the case of an electric vehicle, the heating function is no longer realized by the circulation of the coolant in the heat exchanger.

A water circuit may be provided to heat the passenger compartment.

This mode of heating may prove unsuitable or insufficient to ensure rapid and effective heating of the passenger compartment of the vehicle.

Furthermore, in order to reduce the space requirement and the costs on account of the additional water circuit, it is also known to use, for the electric vehicle, an air-conditioning loop that operates in a heat pump mode. Thus, the air-conditioning loop for cooling a flow of air in a conventional manner with the aid of a coolant fluid is used in this case to heat up the flow of air. For this purpose, it is appropriate to use an evaporator of the air-conditioning loop as a condenser.

However, this mode of heating may also prove unsuitable or insufficient. This is because the performance of the air-conditioning loop in the heat pump mode is dependent on outside climatic conditions; in this case, outside air at an excessively low temperature cannot be used as a source of heat energy.

In order to alleviate these drawbacks of the prior art, a known solution consists in adding an additional electrical heating device to the heat exchanger or to the water circuit or else to the air-conditioning loop.

Such an electrical heating device may be suitable for upstream heating of the liquid, such as the coolant for the heat engine, or the water for the water circuit for heating the passenger compartment of the electric vehicle or else the coolant fluid of the air-conditioning loop.

For example, electrical heating devices of this type comprising a plurality of heating elements, such as positive temperature coefficient or PTC elements, which are accommodated in a housing so as to define a heating chamber around the plurality of PTC heating elements and in which the liquid to be heated circulates, are known.

However, such heating devices have a relatively large space requirement and may also be quite heavy.

In addition, these known electrical heating devices may have a relatively large head loss which is inconsistent with the reference values set by certain motor vehicle manufacturers.

Moreover, some known heating devices may have high heating inertia, limiting thermal performance.

Therefore, the object of the invention is to at least partially remedy the drawbacks of the prior art by proposing an electrical heating device which has a smaller space requirement while limiting the head loss and the heating inertia.

To this end, the subject of the invention is an electrical liquid heating device for a motor vehicle, said heating device comprising at least one first and one second module for heating said liquid, defining at least one circuit for guiding the liquid to be heated, characterized in that said heating modules each have an approximately cylindrical overall shape and are positioned side by side in an approximately parallel manner.

The heating device may also have one or more of the following features, taken separately or in combination:
 said heating modules respectively comprise a core and a heating means surrounding said core so as to define a circuit for guiding the liquid around said core;
 said at least one first and one second heating modules define at least two serial guiding circuits;
 said device has at least one communicating canal between the guiding circuits of said at least one first and one second heating modules;
 said serial guiding circuits define an approximately "U"-shaped path;
 said at least one first and one second heating modules define at least two approximately parallel guiding circuits;
 said core of at least one heating module has an internal cavity communicating with said liquid guiding circuit and comprising air that is able to be compressed under the effect of the expansion of the heated liquid, such that said internal cavity forms an expansion vessel;
 said core comprises an expansion control means;
 said expansion control means has at least one calibrated passage, through which said liquid is able to circulate;
 said expansion control means is configured to slide along said internal cavity of said core;
 said expansion control means comprises a piston;
 said device has at least one liquid inlet tube and at least one liquid outlet tube communicating with at least one guiding circuit defined by said at least one first and one second heating modules;
 said inlet tube communicates with the guiding circuit of said first heating module, and in that said outlet tube communicates with the guiding circuit of said second heating module;
 said inlet tube and/or said outlet tube is/are located in said device in a manner approximately parallel to a longitudinal axis of a heating module;
 said inlet tube and said outlet tube are located on one and the same side of said device;
 said inlet tube is located on a first side of said device, and said outlet tube is located on a second side of said device, opposite said first side;
 said at least one inlet tube and at least one outlet tube are oriented in the same direction;

said at least one inlet tube and at least one outlet tube are oriented in two opposite directions;

said core of a heating module has at least one groove on its external face facing said heating means;

said core of a heating module has at least one longitudinal internal circulation canal.

The invention also relates to a heating and/or air-conditioning unit for a motor vehicle, characterized in that it comprises an electrical heating device as defined above.

Figure 5B:
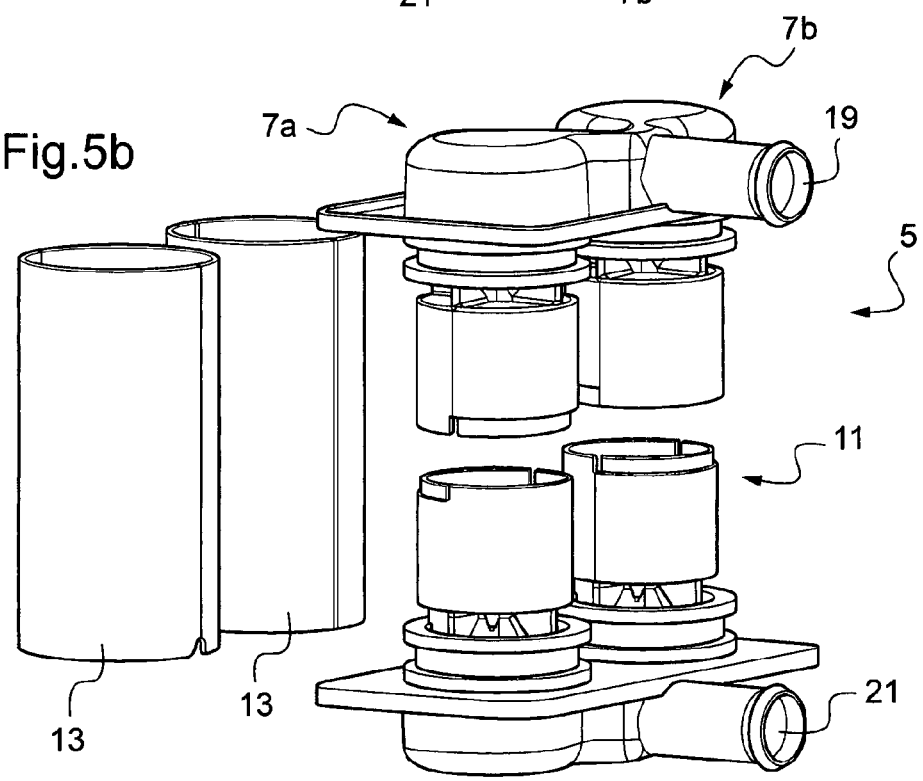

Further features and advantages of the invention will become more clearly apparent from reading the following description, given by way of nonlimiting and illustrative example, and from the appended drawings, in which:

FIG. 1 schematically shows in a simplified manner a heating unit of a motor vehicle, comprising an additional electrical heating device, FIG. 2a is a sectional front view of the heating device according to a first embodiment, FIG. 2b is a sectional side view of the heating device from FIG. 2a according to the first embodiment, FIG. 3a schematically shows in a simplified manner a heating module of the heating device, serving as an expansion vessel, FIG. 3b schematically shows in a simplified manner a heating module of the heating device, serving as an expansion vessel having an expansion control means according to a first variant, FIG. 3c schematically shows in a simplified manner a heating module of the heating device, serving as an expansion vessel having an expansion control means according to a second variant, FIG. 4 is a simplified diagram showing a sectional view of the heating device according to a second embodiment, FIG. 5a illustrates a heating device according to the second embodiment with a sectional view of a heating module, FIG. 5b is a view showing the elements of the heating device according to the second embodiment in FIG. 5a, FIG. 6 is a view showing the elements of the heating device according to the second embodiment with the liquid inlet and outlet in opposite directions, FIG. 7 is a simplified diagram showing a sectional view of the heating device according to a third embodiment, and FIG. 8 is a simplified diagram showing a sectional view of the heating device according to another embodiment.

In these figures, substantially identical elements have the same references.

FIG. 1 schematically shows a part of a motor vehicle heating and/or air-conditioning unit 1, comprising a water heating circuit 3 for heating the passenger compartment of an electric vehicle.

This heating unit comprises, upstream of the water heating circuit 3, an additional electrical heating device 5 for heating the water before it enters the heating circuit 3.

Shown here is the case of a water circuit for heating the passenger compartment of an electric vehicle.

Of course, it is also possible to provide for the electrical heating device 5 to be located upstream of the evaporator of an air-conditioning loop that is able to operate in a heat pump mode, so as to heat the coolant fluid.

It may also be possible to provide such an electrical heating device 5 upstream of a heat exchanger using the coolant of the heat engine as heat transfer liquid. It may also be possible to provide such an electrical heating device 5 upstream of a heat exchanger intended to thermally regulate an electrical energy storage device, sometimes known as a battery pack, for an electric or hybrid vehicle.

With reference to FIGS. 2a and 2b, a first embodiment of this electrical heating device 5 will now be described in more detail.

The heating device 5 has at least one first heating module 7a and one second heating module 7b placed side by side in an approximately parallel manner.

The heating modules 7a, 7b have an approximately cylindrical overall shape.

The two heating modules 7a, 7b are placed side by side with their longitudinal axes A parallel. The longitudinal axes A of the heating modules 7a, 7b are not coincident and their extensions do not meet.

This side-by-side arrangement of the heating modules 7a, 7b reduces the space requirement of the heating device 5 in the longitudinal direction.

In addition, the heating device 5 having such an arrangement of the heating modules 7a, 7b has less high heating inertia compared with some solutions known from the prior art.

Moreover, the Applicant has found that with such a heating device 5, a head loss of less than 50 mbar at 1000 L/h is obtained. These results meet the constraints relating to head loss that are set by some motor vehicle manufacturers.

Each heating module 7a, 7b is accommodated in an associated housing of the heating device 5.

A heating module 7a, 7b comprises a central core 11 and a heating means 13 produced in the form of an enclosure surrounding the central core 11 so as to define a circuit 15 for guiding the liquid to be heated between the central core 11 and the enclosure 13. This enclosure 13 comprises heating elements controlled by a control system 17 for heating the liquid by heat exchange between the enclosure and the liquid circulating in the guiding circuit 15.

The central core 11 and the enclosure 13 may be concentric.

Thus, the external surface of the central core 11 and the internal surface of the enclosure 13 define a circulation volume of the liquid to be heated.

According to the embodiment illustrated in FIGS. 2a and 2b, each heating module 7 comprises a circuit 15 for guiding the liquid between the core 11 and the enclosure 13.

Elements for disrupting the flow of liquid in the guiding circuit 15 may be provided so as to increase the heat exchange between the liquid and the enclosure 13.

The central core 11 may be produced in one piece or, as a variant, in two parts.

The central core 11 may be produced in the form of a hollow body.

The central core 11 has for example an approximately cylindrical shape.

Provision may be made for the core 11 to have a section that is approximately constant or, by contrast, varying.

With an approximately constant section of the central core 11, the liquid flows at a constant speed through the guiding circuit 15.

By contrast, with a varying section, the speed of flow changes along the guiding circuit 15.

Moreover, according to the embodiment illustrated, the core 11 has an approximately helical external groove 16 on its external surface, that is to say facing the internal surface of the enclosure 13. On account of this helical groove 16, the guiding circuit 15 defines an approximately helical path.

Of course, provision may be made, as a variant, for the external surface of the core 11 without a groove, so as to define an axial guiding circuit parallel to the longitudinal axis A.

According to another variant, which is not shown, the core 11 may have a plurality of circular grooves on its external surface.

In this case, a communicating orifice is provided in the region of each circular groove such that the interior of the core 11 communicates with the guiding circuit 15. Thus, the liquid passing into a heating module 7a, 7b flows inside the core 11 and around the core 11 in a circular manner.

For its part, the enclosure 13 also has an approximately cylindrical shape.

Of course, the enclosure 13 is produced in the form of a hollow body so that the central core 11 is received in the interior of the enclosure 13.

The enclosure 13 may for example have at least one resistive track connected to the control system 17 (cf. FIG. 2b) of the heating modules 7a, 7b.

The resistive track or tracks is/are produced for example by screen printing on the external surface of the enclosure 13, that is to say opposite the surface of the enclosure 13 facing the central core 11.

In addition, the enclosure 13 may have sealing means 18 positioned inside the enclosure 13 of each heating module 7a, 7b in the region of the ends of the enclosure 13.

The heating device 5 also has at least one liquid inlet 19 and at least one liquid outlet 21 communicating with the guiding circuits 15 so as to allow the liquid to flow in the heating modules 7a, 7b.

This inlet 19 and outlet 21 are produced for example in the form of an inlet tube 19 and an outlet tube 21, respectively.

The inlet tube 19 and the outlet tube 21 are, for example, respectively positioned in a projecting manner with respect to the heating device 5.

According to the first embodiment, the heating device 5 has an inlet tube 19 communicating with the guiding circuit 15 of the first heating module 7a and an outlet tube 21 communicating with the guiding circuit 15 of the second heating module 7b.

To this end, the inlet tube 19 has an inlet canal 23 for the admission of the liquid, this inlet canal 23 leading into the guiding circuit 15 of the first heating module 7a. Similarly, the outlet tube 21 has an outlet canal 25 for the evacuation of the liquid, this outlet canal 25 communicating with the guiding circuit 15 of the second heating module 7b.

In addition, the inlet canal 23 and outlet canal 25 may be provided respectively in the tubes 19, 21 in a manner parallel to the longitudinal axis A of each heating module 7a, 7b.

More specifically, the inlet canal 23 and the outlet canal 25 may be respectively coaxial with the central core 11 of the associated heating module 7a, 7b.

Moreover, it is possible to arrange the inlet tube 19 and outlet tube 21 on one and the same side of the heating device 5, as in the example illustrated in FIG. 2a. As a result, the liquid follows an approximately "U"-shaped path.

A communicating canal 26 connecting the two guiding circuits 15 of the two heating modules 7a, 7b is also provided. This communicating canal 26 is located, according to the example illustrated, facing the free ends of the heating modules 7a, 7b and such that the guiding circuits lead into this communicating canal 26.

Thus, as is illustrated schematically by the arrows in FIG. 2a, the liquid enters the heating device 5 via the inlet tube 19 on the side of the first heating module 7a. Since the inlet canal 23 communicates with the guiding circuit 15 defined in the first heating module 7a, the liquid circulates between the core 11 and the enclosure 13 of the first heating module 7a.

This circulation takes place in an approximately helical manner according to the embodiment of the core 11 illustrated. As described above, axial or else approximately circular circulation may be provided.

Since the guiding circuit 15 defined in the first heating module 7a leads into the communicating canal 26, the liquid then passes into the communicating canal 26 and is guided into the guiding circuit 15 of the second heating module 7b that also leads with the communicating canal 26.

Similarly, the liquid can circulate in an approximately helical, axial or else circular manner around the central core 11 of the second heating module 7b before leaving the heating device 5 via the outlet canal 25 of the outlet tube 21.

The guiding circuits 15 of the two heating modules 7a, 7b are thus serial.

Furthermore, since the cores 11 are produced in the form of hollow bodies, their internal cavities 12 may act as expansion vessels for the heated liquid.

Such zones for storing the heat transfer fluid allow the hydraulic circuit to absorb the expansion of the heated fluid, as is shown in FIGS. 3a to 3c.

To this end, the internal cavities 12 contain air in their upper part. This upper part is demarcated schematically in FIGS. 3a to 3c by the dotted line. The upper part of the internal cavity 12 is that part of the internal cavity that is directly adjacent to the inlet canal 23 for example.

Moreover, the core 11 has at least one communicating orifice 14 between the internal cavity 12 and the guiding circuit 15 around the core 11, which is thus external. The liquid in the external guiding circuit 15 is represented schematically by the lines L.

Thus, the air contained or "trapped" in the upper part of the internal cavity 12 is able to be compressed under the effect of the expansion of the heated liquid which passes into the internal cavity 12, as is illustrated schematically by the arrow F.

Preferably, the core 11 comprises an expansion control means, in contrast to the variant without an expansion control means which is illustrated in FIG. 3a.

According to a first embodiment, which is illustrated in FIG. 3b, said control means has a fixed partition 39 at the end of the core 11, which thus defines an internal volume of the expansion vessel and is provided with at least one calibrated passage 41, through which the heat transfer fluid, namely the heated liquid, is able to circulate.

Of course, the communicating orifice 14 between the internal cavity 12 and the external guiding circuit 15 is located between the partition 39 and the end of the core 11. Thus, the liquid coming from the guiding circuit 15 passes through the communicating orifice 39 before passing through the calibrated passage 41, making it possible to control the expansion of the heated liquid.

According to a second embodiment, which is illustrated in FIG. 3c, said control means has a mobile partition 43 that is able to slide along the internal cavity 12 of the core 11. Such a mobile partition 43 delimits a sealed zone 45 containing air which is compressed under the effect of the expansion of water for example. The mobile partition 43 is similar to a piston which has an end wall 43a having an approximately cylindrical shape and a tubular side wall 43b located at the periphery of the end wall 43a. The side wall 43b preferably has a sealing means such as a seal 47, such that sealing is ensured between the mobile partition 43 and the core 11.

Under the effect of the expansion of the heated liquid, such as water, the internal volume of the core 11 containing air is reduced, this tending to compress the air contained therein.

Referring again to FIG. 2b, the control system 17 of the heating elements carried by the enclosure 13 is for its part located on a longitudinal wall of the device 5.

This control system 17 may for example have at least one electric circuit support such as a printed circuit board, PCB, 27 and electronic and/or electrical components 29 carried by the support 27. These electronic and/or electrical components may for example comprise a microcontroller and electrical contacts connected to the resistive tracks of the enclosure 7b. The electrical contacts are for example carried by a face of the PCB support 27 that is opposite the face that carries for example the microcontroller.

The support 27 may also carry at least one power and signal connector 31.

The heating device 5 may also have a protective cover 33 for the control system 17. This cover 33 has an opening for the connector 31 to pass through.

For this embodiment, power of around 2 kW may be provided for each enclosure 13 of the two heating modules 7a, 7b.

Such an arrangement of the control system 17 contributes toward the compactness of the heating device 5.

A second embodiment is described with reference to FIGS. 4 to 6.

This second embodiment differs from the first embodiment described above in that the two heating modules 7a, 7b define two parallel and no longer serial guiding circuits 15.

To this end, a heating module 7a, 7b has both an inlet canal 23 on a first side of the heating module 7a, 7b and an outlet canal 25 on a second side of the heating module 7 opposite the first side. The liquid circulates along the guiding circuit 15 of the heating module 7a, 7b, approximately parallel to the longitudinal axis A of the heating module 7a, 7b.

Moreover, the inlet 19 for the two heating modules 7a, 7b is positioned on the same side of the device 5 and the outlet 21 is positioned, for the two heating modules 7a, 7b, on the opposite side, such that the liquid circulates in the same direction in both heating modules 7a, 7b.

It is possible in particular to provide a common inlet 19 for the two heating modules 7a, 7b and also a common outlet 21 for the two heating modules 7a, 7b.

More specifically, with reference to FIGS. 5a to 6, a common inlet tube 19 may be provided for the two heating modules 7a, 7b, which divides in two so as to respectively supply each heating module 7a, 7b. Similarly, a common outlet tube 21 may be provided, which divides in two so as to receive the liquid exiting each heating module 7a, 7b.

As FIGS. 4, 5a and 5b illustrate, provision may be made for the inlet 19 and the outlet 21 to be oriented in the same direction or, by contrast, according to the variant in FIG. 6, for them to be oriented in two opposite directions.

Furthermore, in a manner similar to the first embodiment, the cores 11 of the two heating modules 7a, 7b may have an internal cavity 12 that acts advantageously as an expansion vessel, making it possible to absorb the variations in volume of the liquid that result from the heating of this liquid. Specifically, the internal cavity 12 of each core 11 contains air in its upper part, this air being able to be compressed under the effect of the expansion of the liquid. As above, an expansion control means may be provided, such as a calibrated passage or a mobile partition that is able to slide along the internal cavity 12 of the core 11 like a piston with the expansion of the fluid.

A third embodiment will now be described with reference to FIGS. 7 and 8. In these figures, the arrows schematically illustrate the path of the liquid in the heating device 5.

This third embodiment differs from the second embodiment in that, for each heating module 7a, 7b, an internal circulation canal 35 of the core 11 defines an internal guiding circuit in the interior of the core 11.

According to the example illustrated, the internal circulation canal 35 is provided approximately in the center of the central core 11.

Moreover, according to the exemplary embodiments illustrated, provision may be made for the inlet tube 19 and the outlet tube 21 to be located on the same side of the heating device 5.

The two tubes 19, 21 may for example be located one above the other.

For this purpose, the inlet tube 19 may be arranged approximately perpendicularly to the longitudinal axes A of the heating modules 7a, 7b and the outlet tube 21 may be arranged above the inlet tube 19.

In this case, the internal circulation canals 35 respectively have an extension 37 which crosses the inlet tube 19 and leads into the outlet tube 21. For their part, the guiding circuits 15 around the cores 11 communicate with the inlet canal 23 of the inlet tube 19.

In the example illustrated, the outlet tube 21 is produced in one piece with a cover 29 which covers the inlet tube 19 and into which the extensions 37 of the internal circulation canals 35 lead.

The tube 21 may be arranged approximately perpendicularly to the longitudinal axes A of the heating modules 7a, 7b, in a manner similar to the inlet tube 19 (cf. FIG. 7). This outlet tube 21 may be oriented in the same direction as the inlet tube 19 or in the opposite direction.

According to the variant illustrated in FIG. 8, the outlet tube 21 is arranged substantially parallel to the longitudinal axes A of the heating modules 7a, 7b.

Furthermore, provision is made, for each heating module 7a, 7b, of access to the guiding circuit 15 toward the internal circulation canal 35, such that the liquid exiting the guiding circuit 15 passes into the internal circulation canal 35.

According to the example illustrated, the communication canal 26 arranged so as to connect the two guiding circuits 15 defined in the two heating modules 7a, 7b also allows this access of the liquid exiting the guiding circuits 15 into the respective internal circulation canals 35.

Thus, the liquid introduced into the heating device 5 via the inlet tube 19 flows in the respective guiding circuits 15 around the cores 11 of each heating module 7a, 7b.

In a manner similar to the first and second embodiments, the flow of liquid around each core 11 may take place in an approximately helical, or axial or else circular manner.

At the outlet of the guiding circuits 15, the liquid is introduced into the internal circulation canals 35 before being evacuated via the outlet tube 21.

Thus, a heating device 5 comprising at least two heating modules 7a, 7b placed side by side has a reduced space requirement in the longitudinal direction compared with some solutions of the prior art, while having low heating inertia and allowing a reduction in the head loss.

Moreover, the arrangement of the heating modules 7a, 7b may be adapted for serial flow or parallel flows in the two heating modules 7a, 7b.

Finally, the flow of liquid may follow an approximately axial, helical or else circular path depending on the performance required.

The invention claimed is:

1. An electrical liquid heating device for a motor vehicle, the heating device comprising at least one first (7a) and one second (7b) module for heating the liquid and defining at least one liquid flow path (15) for guiding the liquid to be heated, wherein the heating modules (7a, 7b) each have an approximately cylindrical overall shape and are positioned side by side in an approximately parallel manner, wherein the heating modules (7a, 7b) each comprise a core (11) and a heating means (13) comprising heating elements which surrounding the core (11) so as to define one of the at least one liquid flow path (15) for guiding the liquid around the core (11), wherein each of the heating modules (7a, 7b) are received in an associated housing of the heater (5), wherein a longitudinal axis (A) disposed through a center of each of the heating modules (7a, 7b) are parallel such that the longitudinal axes (A) are not coincident and extensions of the longitudinal axes (A) do not meet, and wherein the core (11) includes a plurality of grooves (16) disposed on its external surface, wherein the core (11) of at least one heating module (7a, 7b) has at least one communication orifice (14) and an internal cavity (12) capable of communicating with the liquid flow path (15) through the at least one communication orifice (14) such that the liquid is able to flow between the heating means (13) and the core (11) from an inlet canal (23) to the communication orifice (14) where the liquid enters the internal cavity (12) before exiting the core (11).

2. The device as claimed in claim 1, wherein the at least one first (7a) and one second (7b) heating modules define at least two serial guiding circuits (15).

3. The device as claimed in claim 2, further comprising at least one communicating canal (26) between the guiding circuits (15) of the at least one first (7a) and one second (7b) heating modules.

4. The device as claimed in claim 3, wherein the serial guiding circuits (15) define an approximately "U"-shaped path.

5. The device as claimed in claim 1, wherein the at least one first (7a) and one second (7b) heating modules define at least two approximately parallel guiding circuits (15).

6. The device as claimed in claim 1, wherein the core (11) of at least one heating module (7a, 7b) comprises air that is able to be compressed under the effect of the expansion of the heated liquid, such that the internal cavity (12) forms an expansion vessel.

7. The device as claimed in claim 6, wherein the core (11) comprises an expansion control system (39, 41, 43).

8. The device as claimed in claim 7, wherein the expansion control system (39, 41) has at least one calibrated passage (41), through which the liquid is able to circulate.

9. The device as claimed in claim 7, wherein the expansion control system (43) is configured to slide along the internal cavity (12) of the core (11).

10. The device as claimed in claim 1, further comprising at least one liquid inlet tube (19) and at least one liquid outlet tube (21) communicating with the guiding circuit (15) defined by the at least one first (7a) and one second (7b) heating modules.

11. The device as claimed in claim 10, wherein the inlet tube (19) communicates with the guiding circuit (15) of the first heating module (7a), and wherein the outlet tube (21) communicates with the guiding circuit (15) of the second heating module (7b).

12. The device as claimed in claim 10, wherein the inlet tube (19) and/or the outlet tube (21) is/are located in the device in a manner approximately parallel to the longitudinal axis (A) of a heating module (7a, 7b).

13. The device as claimed in claim 10, wherein the inlet tube (19) and the outlet tube (21) are located on one and the same side of the device.

14. The device as claimed in claim 10, wherein the inlet tube (19) is located on a first side of the device, and in that the outlet tube (21) is located on a second side of the device, opposite the first side.

15. The device as claimed in claim 10, wherein the at least one inlet tube (19) and at least one outlet tube (21) are oriented in the same direction.

16. The device as claimed in claim 10, wherein the at least one inlet tube (19) and at least one outlet tube (21) are oriented in two opposite directions.

17. The device as claimed in claim 10, wherein the core (11) of a heating module (7a, 7b) has at least one groove (16) on its external face facing the heating means (13).

18. The device as claimed in claim 10, wherein the core (11) of a heating module (7a, 7b) has at least one longitudinal internal circulation canal (35).

19. A heating and/or air-conditioning unit for a motor vehicle comprising at least one heating device as claimed in claim 1.

20. The device as claimed in claim 1, wherein the grooves (16) are helical grooves configured to define a helical path through the circuit (15) for guiding the liquid to be heated.

* * * * *